United States Patent [19]

Stansfield et al.

[11] Patent Number: 5,574,875

[45] Date of Patent: Nov. 12, 1996

[54] CACHE MEMORY SYSTEM INCLUDING A RAM FOR STORING DATA AND CAM CELL ARRAYS FOR STORING VIRTUAL AND PHYSICAL ADDRESSES

[75] Inventors: Anthony I. Stansfield; Catherine L. Barnaby; Richard J. Gammack; Roger M. Shepherd, all of Bristol, United Kingdom

[73] Assignee: Inmos Limited, Bristol, United Kingdom

[21] Appl. No.: 31,241

[22] Filed: Mar. 12, 1993

[30] Foreign Application Priority Data

Mar. 13, 1992 [GB] United Kingdom ............... 9205551

[51] Int. Cl.$^6$ ............................................. G06F 12/02
[52] U.S. Cl. .................... 395/403; 395/445; 395/413; 395/416; 364/DIG. 1; 364/243.41; 364/256.4
[58] Field of Search .................................. 395/400, 425, 395/403, 445, 413, 415, 416, 417, 418, 419; 365/49

[56] References Cited

U.S. PATENT DOCUMENTS

| 4,538,241 | 8/1985 | Levin et al. | 395/400 |
| 4,785,398 | 11/1988 | Joyce et al. | 395/425 |
| 4,813,002 | 3/1989 | Joyce et al. | 365/49 |
| 4,991,081 | 2/1991 | Bosshart | 395/425 |
| 5,263,140 | 11/1993 | Riordan | 395/400 |
| 5,283,882 | 2/1994 | Smith et al. | 395/425 |
| 5,299,147 | 3/1994 | Holst | 365/49 |

Primary Examiner—Eddie P. Chan
Assistant Examiner—Hiep T. Nguyen
Attorney, Agent, or Firm—Felsman, Bradley, Gunter & Dillon, LLP

[57] ABSTRACT

A fully associative cache memory for virtual addressing comprises a data RAM (50), a first CAM cell array (51) for holding virtual page addresses which each require address translation to identify a physical page in a main memory, a second CAM cell array (52) holding line or word in page addresses which remain the same for virtual and physical addresses, a physical address memory (53) for holding physical page addresses for the main memory corresponding to virtual page addresses in said first array (51), said first array (51) being connected both to said physical address memory (52) to access said physical address memory in response to a hit output from said first CAM cell array and to control circuitry (57) coupled between said first and second arrays (51,52) and the data RAM (50) to access the data RAM (50) in response to hit outputs from both said first and second CAM cell arrays (51,52).

16 Claims, 6 Drawing Sheets

CACHE MEMORY SYSTEM INCLUDING A RAM FOR STORING DATA AND CAM CELL ARRAYS FOR STORING VIRTUAL AND PHYSICAL ADDRESSES

The invention relates to cache memories and particularly to cache memories for use with virtual memory addressing.

BACKGROUND OF THE INVENTION

Cache memories are used as small high speed buffer memories between a processor and a main memory. They may be used to hold the most active portion of a main memory in order to improve access times for those contents of the memory which are most frequently used by the processor.

Known cache memories generally fall into one of three types. They may be fully associative, set associative or direct mapped. Fully associative cache memories may consist of a content addressable memory (CAM) and a data RAM. Content addressable memories (CAMs) consist of rows and columns of memory cells generally similar to RAM cells providing read and write functions but additional circuitry is provided to permit association. The CAM cells are used to hold memory addresses and during an association operation an input to the CAM represents a memory address and the CAM compares the input with the addresses held in the CAM to see whether or not a match occurs and when a match is found an output signal is provided to a corresponding location in the data RAM so that a read or write operation may take place with the corresponding location in the data RAM of the cache. The cells of the CAM are arranged so that each row of cells holds a memory address and that row of cells is connected by a match line to a corresponding word line of the data RAM to enable access of the data RAM in that word line when a match occurs on that match line. In a fully associative cache each row of the CAM holds the full address of a corresponding main memory location and the inputs to the CAM require the full address to be input.

In a direct mapped cache the address of each main memory location used in the cache is divided into a first part represented by the most significant bits, usually referred to as the page address, and a second part represented by the least significant bits and usually referred to as the line in page address. A RAM (called a Tag RAM) is used to hold a plurality of page addresses of memory locations in the main memory. Data is held in a data RAM as already described. However the input to the Tag RAM and the data RAM uses only the line in page part of the memory addresses. The Tag RAM is accessed at the location identified by the line in page address and the RAM outputs to a comparator the stored page address from that RAM location. The most significant bits of the main memory address are fed directly to the comparator to see whether or not they agree with the corresponding most significant bits of the address output by the RAM. If they agree then a cache hit is obtained and data is output from the location of the data RAM accessed by the line in page input. If no agreement is found by the comparator then access to the data RAM is prevented.

In a set associative cache a plurality of Tag RAMs are used in parallel and the least significant bits of each input address are used to address each of the Tag RAMs in parallel as well as associated data RAMs. The page address held in the addressed row of each Tag RAM is output and compared in a comparator with the most significant bits of the main memory address which are fed directly to the comparator similar to the process already described for a direct mapped cache. If the output of one of the Tag RAMs is found to agree on comparison of the most significant address bits with the main memory address then the corresponding word line of the data RAM associated with that Tag RAM is accessed.

It will therefore be understood that it is only in a fully associative cache that all bits of the memory location address are required as an initial input in order to determine whether the cache contains data corresponding to that memory location. The other types of cache only require as an initial input some of the bits of the memory location address.

In many applications it is desirable to use virtual memory addressing whereby a process executes instructions referring to virtual memory locations. Conveniently virtual addresses are defined as a virtual page address together with a line or word in page address. Commonly the line or word in page address may be the same for both physical and virtual addresses and the virtual aspect of the addressing is dealt with solely in the virtual page address. Conveniently the page addresses may be dealt with by the most significant bits of an address and the line or word in page address may be indicated by the least significant bits of the address. When executing a process using virtual addresses it is necessary to translate the virtual page address into a physical page address corresponding to an actual physical location in the main memory. If virtual addressing is to be used with a cache memory it will be understood that a fully associative cache would normally require translation of the virtual page address into a physical page address before the full address to be searched by the CAM could be input to the CAM. The translation of virtual page addresses to physical page addresses may be carried out by a translation lookaside buffer (TLB). To require the use of such a TLB to form a physical page address from a virtual page address before inputting an address to a fully associative cache does of course introduce additional delay and reduce the value of using a cache memory. For this reason caches using virtual addressing have usually been formed as a direct mapped or set associative cache. In this way the input address to the Tag RAMs and data RAMs has constituted the line or word in page address which does not require translation to a physical address. The most significant bits of the virtual address forming the virtual page address are not used in the initial input to the RAMs but have been fed through a TLB to form a physical page address in parallel with the addressing operation of the RAMs by the line in page input to the RAMs. If a valid entry is found in one of the RAMs for the line in page address then the page address representing the physical address of the corresponding main memory location is output from the RAM to a comparator where the most significant bits of that address may be compared with the output of the TLB now representing the physical page address determined by the address translation operation. As the RAM accessing operation and the translation from virtual to physical page address are both carried out in parallel there is no additional delay of the type which has been necessary if virtual memory addressing is used with a fully associative cache.

It is an object of the present invention to provide an improved cache which permits virtual addressing without the additional delay of requiring address translation prior to searching the cache for a corresponding entry.

SUMMARY OF THE INVENTION

The invention provides a fully associative cache memory for virtual addressing comprising a data RAM, a first CAM cell array for holding virtual page addresses which each require address translation to identify a physical page in a main memory, a second CAM cell array holding line or word in page addresses which remain the same for virtual and physical addresses, a physical address memory for holding physical page addresses for the main memory corresponding to virtual page addresses in said first array, said first array being connected both to said physical address memory to access said physical address memory in response to a hit output from said first CAM cell array and to control circuitry coupled between said first and second arrays and the data RAM to access the data RAM in response to hit outputs from both said first and second CAM cell arrays.

The invention also provides a cache memory device for virtual addressing which device comprises a data RAM for holding data corresponding to selected locations in a main memory, first and second content addressable memory (CAM) cell arrays for holding respectively most and least significant bits of virtual addresses corresponding to said selected locations for which data is held in said data RAM, input circuitry for inputting bits of a virtual address as first and second inputs to said first and second arrays respectively in each cache access operation, output circuitry for providing first and second outputs from said first and second arrays respectively to indicate a cache hit when each of said first and second arrays holds bits of an address corresponding respectively to the bits of said first and second inputs, first control circuitry interconnecting said first and second outputs and connected to said data RAM to access a selected location of said data RAM when both said first and second outputs indicate a cache hit, and a physical address memory holding a plurality of physical addresses of locations in said main memory corresponding to virtual addresses in said first array, said physical memory being connected by second control circuitry to said first output of said first array to access a selected location of the physical address memory when said first output includes a hit signal indicating that the first array holds bits of an address corresponding to said first input.

Preferably each said virtual address comprises a page address and a line-in-page address, said first array holding a plurality of virtual page addresses and said second array holding a plurality of line-in-page addresses.

Preferably said physical address memory comprises a plurality of addressable storage locations each of which may be written to or read from, and said second control circuitry is arranged to access a selected storage location in the physical address memory in response to a first output including a hit signal from said first array to read a physical address from the physical address memory corresponding to the virtual address in the first array which generated the signal in said first output.

Preferably said first control circuitry includes gating circuitry to indicate a cache hit when both said first and second outputs include hit signals indicating location in the first and second arrays of addresses corresponding to the respective first and second inputs.

Preferably said second control circuitry includes gating circuitry to indicate an address translation hit when said first output includes a hit signal indicating a location in the first array of an address corresponding to the said first input.

Preferably said physical address memory comprises a CAM operable both as a RAM when accessed by said first array and operable as a CAM in response to a physical address input.

Preferably said physical address memory comprises a CAM having an input for receiving a physical address and a CAM output connected to said first control circuitry whereby said data RAM may be accessed by virtual addressing of said first and second arrays or by physical addressing of said physical address memory and said second array.

Preferably each of said first and second arrays, data RAM and physical address memory comprise storage locations arranged in rows, each row in the data RAM being associated with a corresponding row in each of the first and second arrays and physical address memory.

Preferably each row of storage locations in one of the arrays of CAM cells includes in addition to storage locations for bits of a virtual address, at least one location for a status bit for use in protecting the corresponding main memory location.

Preferably one or both of said first and second arrays includes circuitry having a don't care input operable to cause CAM cells connected to that don't care input to provide a match with the respective first or second input regardless of the data stored in the cell.

Preferably each CAM cell has a match line for each row of cells, circuitry for precharging each match line, and control circuitry for each column of cells, the control circuitry having control inputs to initiate an associate operation for the cells of that column, each cell having discharge circuitry coupled to said control circuitry for discharging the match line by any cell in the column which has data stored corresponding to data input to that column during an associate operation.

Preferably each column of cells in said first array of CAM cells is connected to control circuitry having a said don't care input.

It will be seen that preferred embodiments use one virtual page CAM for the dual function of determining if a cache hit arises and effecting an address translation from virtual to physical page number.

The invention also provides a fully associative cache memory comprising a data RAM, a first CAM cell array for holding virtual addresses, a second CAM cell array holding physical addresses and connecting circuitry interconnecting both said first and second CAM cell arrays with said data RAM to permit access to data in the data RAM when a match is found in either the first or second CAM cell array.

Preferably both physical and virtual addresses are each provided by a page address and a separate line or word in page address, said first CAM array storing a plurality of virtual page addresses, said second CAM array storing physical page addresses and a third CAM array interconnected with both said first CAM array and said second CAM array and providing line or word in page addresses common to both the virtual and physical page addresses in said first and second CAM arrays.

DESCRIPTION OF THE PREFERRED EMBODIMENTS

Figure 1:
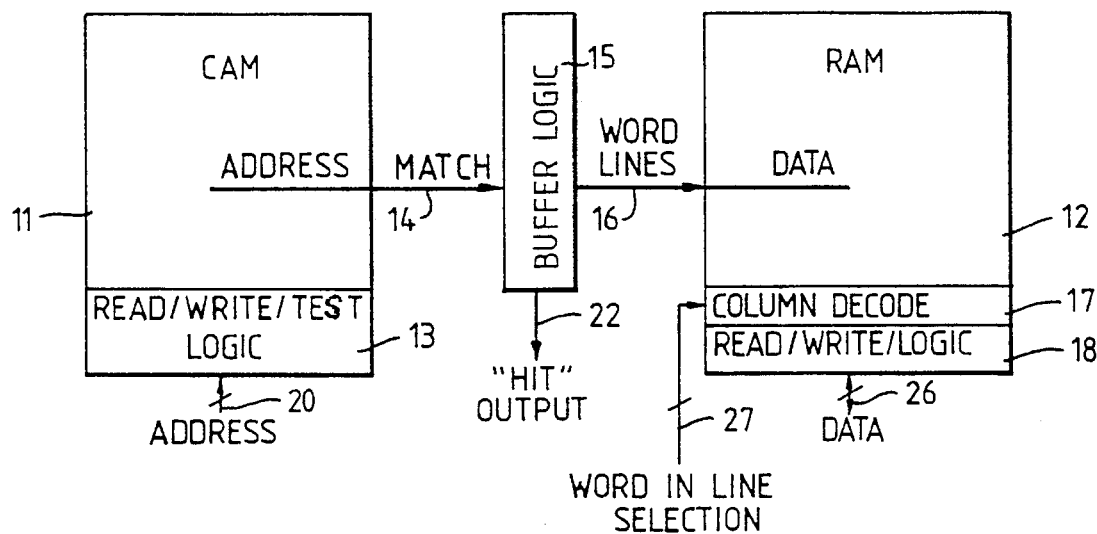
FIG. 1 is a block diagram of a fully associative cache not embodying the present invention.

FIG. 1 shows a known arrangement of a fully associative cache comprising a content addressable memory (CAM) 11 together with a data RAM 12. The CAM 11 comprises a plurality of CAM cells (which may be of the form shown in FIG. 8) arranged in rows and columns operable in known manner under the control of logic circuitry 13 to carry out read, write or test operations in known manner. The test operation is the association operation referred to above. Each row of cells in the CAM is arranged to hold the address, of a memory location in a main memory and each row of the CAM is connected by a respective match line 14 (only one of which is shown) through buffer logic 15 to a corresponding word line 16 (only one of which is shown) of a corresponding row of cells in the data RAM 12. The data RAM 12 comprises a plurality of rows and columns of conventional RAM cells operable under the control of a column decoder 17 and read and write logic 18. In operation a memory location address is input on a bus 20 through the control logic 13 to the CAM 11. In a test operation the CAM 11 carries out the association operation referred to above to test whether or not any row in the CAM holds an address matching the address which is input on line 20. As this is a fully associative cache the full address of the required memory location is input at 20 and the test circuitry checks whether or not any row in the CAM holds an address matching the full address input at 20. If a match is found in any row of the CAM then the corresponding match line 14 provides a signal to the buffer logic 15. The buffer logic 15 consists of a plurality of OR gates so that an output 22 is provided indicating a cache hit if any match line 14 is operated to indicate that a match has been found in the CAM 11. The word lines in the RAM 12 do correspond strictly with correspondingly located rows in the CAM 11 so that when a match is found on any one line 14 the uniquely corresponding word line in the RAM 12 is accessed to allow input or output of data to the RAM through bus 26 under control of the logic 18. Each row of the RAM 12 may hold a plurality of words in each line and consequently the column decoder 17 may be operated by a signal on bus 27 to select a selected word in the line of data held in the accessed word line of the RAM. The addresses held in the CAM 11 are physical addresses corresponding to memory locations in the main memory and consequently a virtual addressing system would require translation of the address from the virtual address to the physical address before an input could be supplied on bus 20 to the CAM 11.

Figure 2:
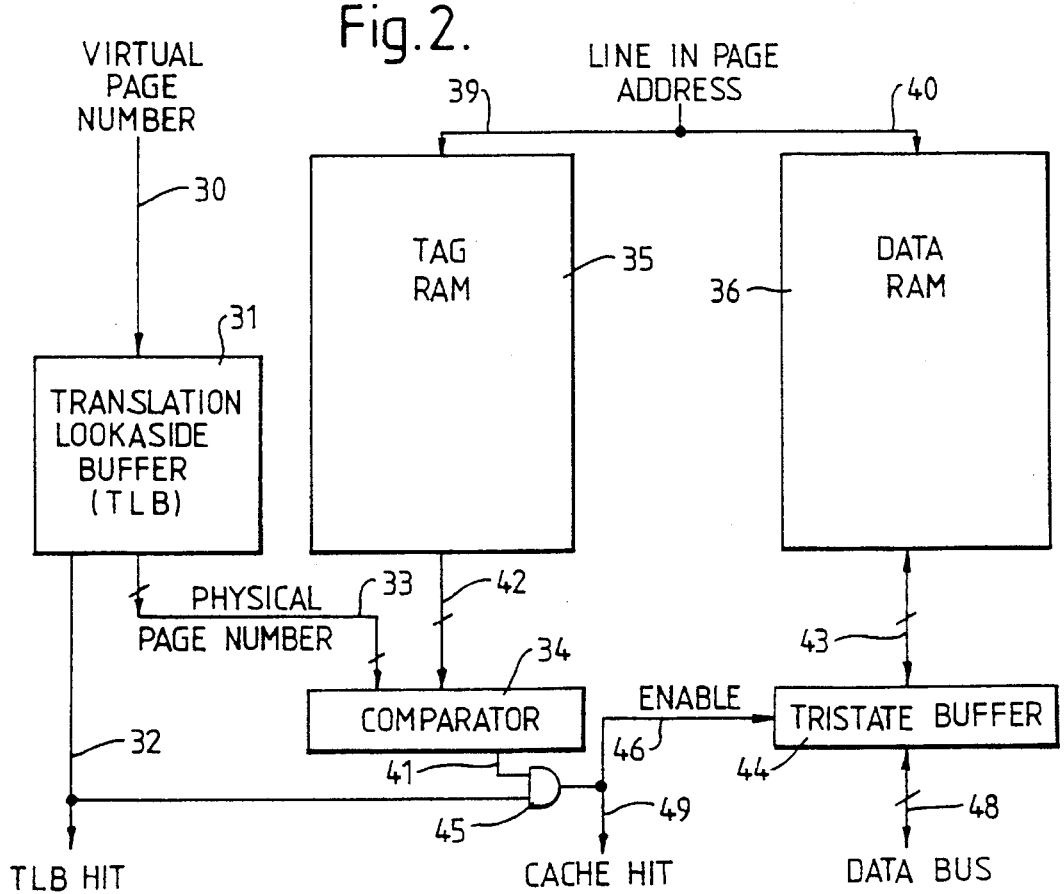
FIG. 2 is a block diagram of a direct mapped cache using virtual addressing, not in accordance with the present invention.

In the arrangement shown in FIG. 2 a conventional direct mapped cache is used with address translation to permit virtual memory addressing. In this case the virtual address used comprises a virtual page number together with a line in page address. The line in page address does not need translation but is the same in both the virtual address and the physical address. The virtual address which is to be used as an input for the cache is split into two. The virtual page address (which is indicated by the most significant bits) is fed on line 30 to a translation lookaside buffer (TLB) of known construction. If that virtual address is located in the buffer a TLB hit is indicated on output line 32. The function of the translation lookaside buffer 31 is to convert the virtual page number into a corresponding physical page number which is output on bus 33 to a comparator 34. The cache includes a RAM 35 holding the physical page addresses of each of the memory locations for which data is held in corresponding locations in a data RAM 36. The RAM 35 holding the page addresses is referred to as a Tag RAM. The line in page address which is represented by the least significant bits of the virtual address is supplied in parallel on lines 39 and 40 to the Tag RAM 35 and data RAM 36 respectively. In this case the inputs 39 and 40 represent RAM addresses and are decoded to access the corresponding locations of the Tag RAM 35 and data RAM 36. The location addressed in the Tag RAM causes an output on bus 42 of the physical page address of the memory location held at the address location of the Tag RAM. The data corresponding to that physical address is output on bus 43 from the data RAM 36. The data on bus 43 is held in a buffer 44 and may be output or not depending on the output of an AND gate 45 on an enable line 46. The comparator 34 compares the most significant bits of the physical address on line 42 with the physical page number supplied on line 33 from the TLB 31. If the comparator 34 determines that the location of the Tag RAM 35 which has been addressed does indeed correspond to the correct physical page number determined by the TLB 31 then it provides a signal on line 41 to the AND gate 45. To ensure that the data RAM is accessed only when a TLB hit occurs, the AND gate 45 receives a second input from line 32 so that an enable signal is provided on the line 46 only when a TLB hit occurs on line 32 and the comparator 34 indicates correspondence on lines 33 and 42. An enable signal on line 46 causes the buffer 44 to output the data on bus 48 and a cache hit is signalled on line 49 from the AND gate 45. A cache miss will occur either where the Tag RAM 35 holds the correct line in page address but the page number of the location held in the Tag RAM 35 does not correspond with the physical page number determined by the TLB 31, or where the Tag RAM 35 does not hold a valid entry for the correct line in page address.

Figure 3:
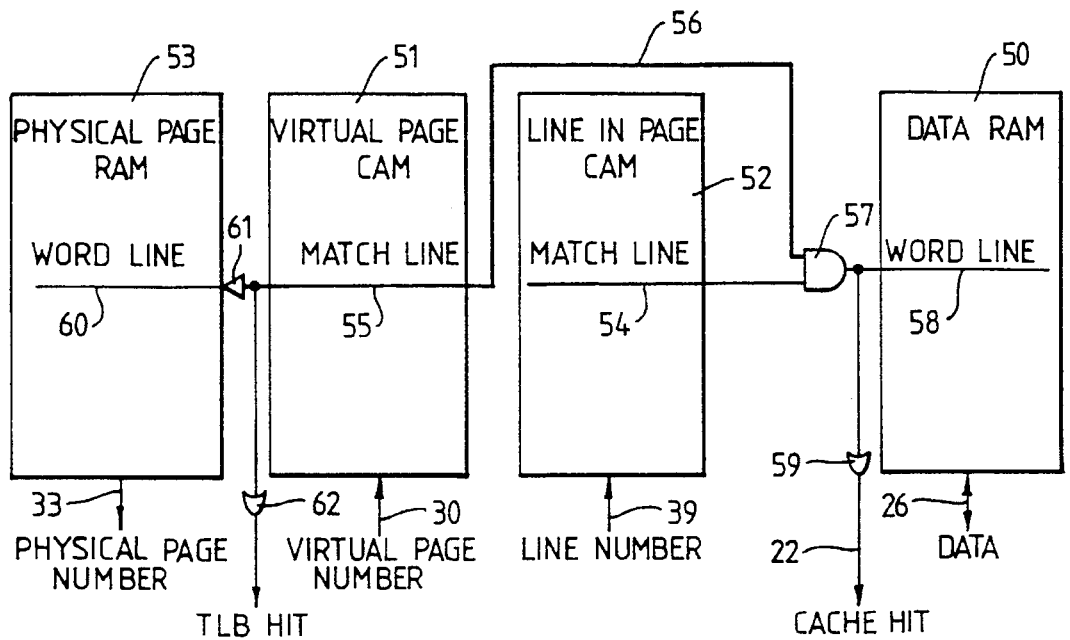
FIG. 3 is a block diagram of a fully associative cache using virtual addressing in accordance with one embodiment of the present invention.
Figure 4:
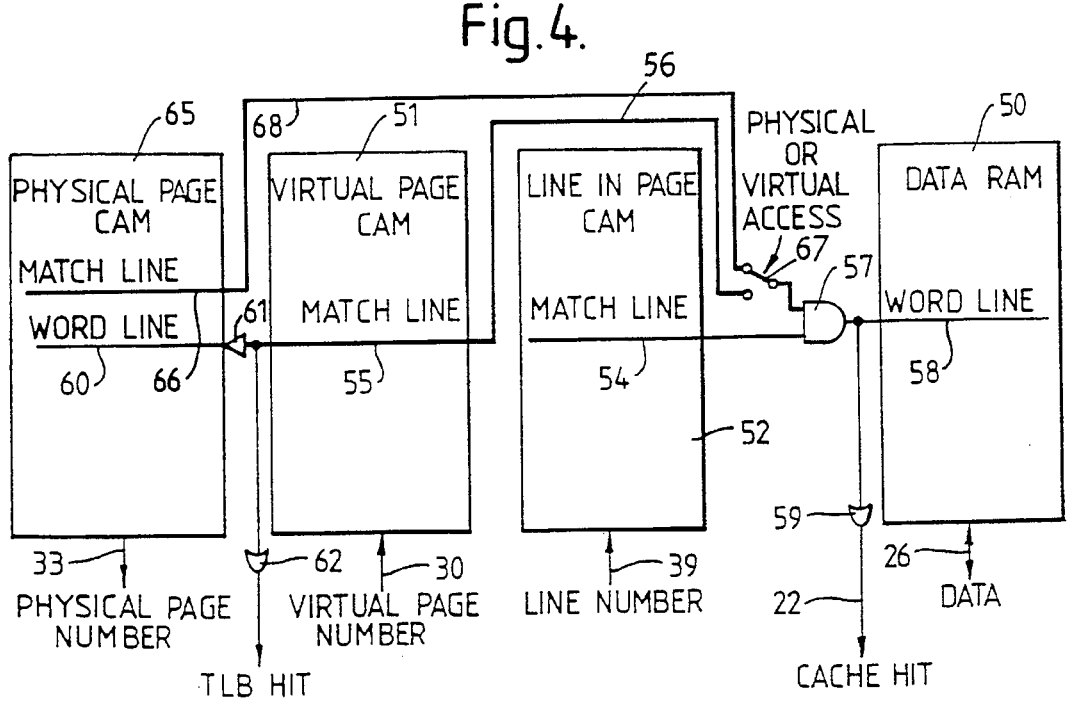
FIG. 4 is a block diagram of a different embodiment of the present invention using virtual addressing with a fully associative cache.
Figure 5:
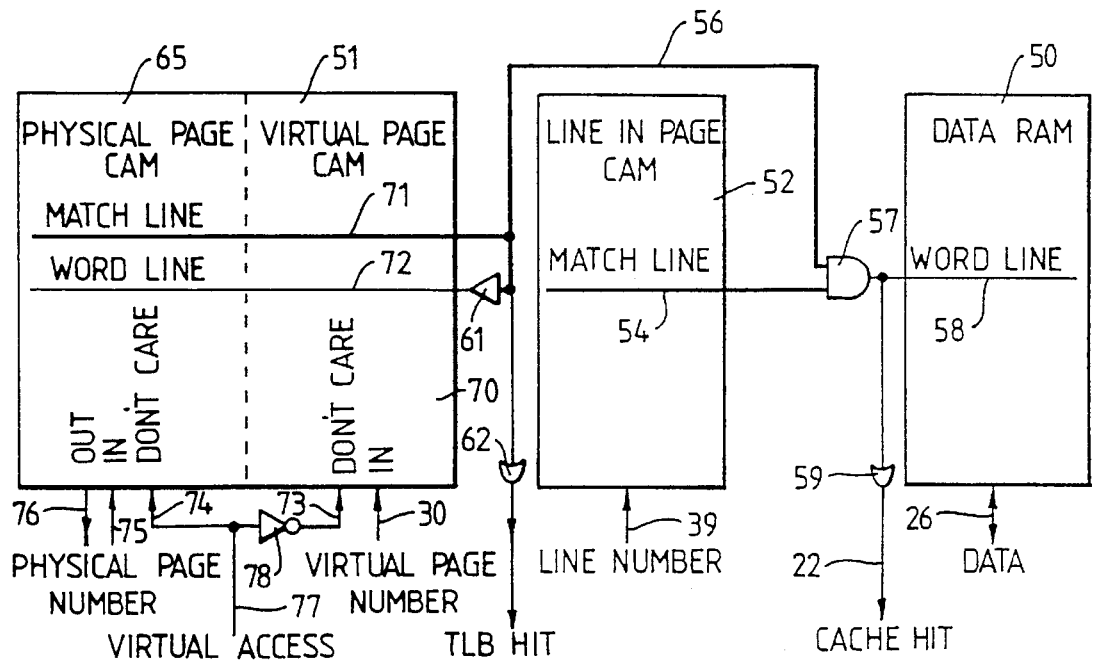
FIG. 5 is a block diagram of a further embodiment of the invention using virtual addressing with a fully associative cache.

The examples of FIGS. 3, 4 and 5 all relate to fully associative caches in accordance with the invention which permit address translation from a virtual page to a physical page without involving the delay of making an address translation before inputting the address to be searched into the cache. They also all provide a dual function for a virtual page CAM in searching for a cache hit and effecting address translation.

In the example shown in FIG. 3 the cache consists of a data RAM 50 which is of similar construction and operation as the RAM 12 described with reference to FIG. 1. The CAM 11 of FIG. 1 has been replaced by two separate CAMs, one CAM 51 holding virtual page numbers and the other CAM 52 holding line in page numbers. It will be understood that references to line in page may also cover word in page. In some instances the contents of each full line may be considered as a single word or where it is necessary to access only part of a line then column decode circuitry may be used as explained in FIG. 1 with reference to circuitry 17 and the input 27 of FIG. 1. In addition a physical page RAM 53 is provided. The construction of the physical page RAM 53 may be similar to that of the data RAM 50 thereby consisting of a plurality of rows and columns of conventional RAM cells operable for read or write operations by energisation of an appropriate word line. The virtual address used may consist of a virtual page number 30 and a line in page number 39 similar to that described with reference to FIG. 2. The virtual page number 30 is input to the virtual page CAM 51 whereas the line in page number 39 is input to the line in page CAM 52. Together the virtual page number 30 and line in page number 39 form the full address indication used in virtual addressing for the memory location required. The inputs 30 and 39 are fed simultaneously to the respective CAMs which carry out test operations for association to determine whether any of the line in page numbers held in the CAM 52 match the input 39 and whether any of the virtual page numbers held in CAM 51 correspond with the virtual page input 30. If a match is found in any of the rows of cells in the respective CAMs 51 and 52 then an appropriate match output is provided on the matching line of the CAM. It will be understood that there are a plurality of possible match lines in each of the CAMs 51 and 52 each line corresponding to one row of CAM cells, each of the rows holding a line in page number in CAM 52 and a virtual page number in CAM 51. In FIG. 3 only a single match line 54 is indicated for CAM 52 and a single match line 55 for CAM 51 as for simplicity only the single line where a match occurred has been indicated. Each of the possible match lines 55 in CAM 51 are connected by a respective line 56 to a corresponding AND gate 57 forming part of a buffer similar to buffer 15 of FIG. 1. Similarly each match line 54 in CAM 52 is connected to its respective AND gate 57. The output of each AND gate 57 is connected to a corresponding word line 58 in the data RAM 50. Although only one AND gate 57 is shown it will be understood that there are a plurality of AND gates 57 each corresponding to one of the rows of CAM cells in each of the CAMs 51 and 52 and the output of each of the AND gates 57 is connected through a single OR gate 59 to provide a cache hit output 52 when both the line in page number and virtual page number have been located in matching rows of the CAMs 51 and 52. It will therefore be understood that data in the data RAM 50 may be accessed by energisation of the appropriate word line 58 so as to input or output data on bus 26 when the virtual page number and line in page number have both been found in corresponding lines of the CAMs 51 and 52 connected to the same AND gate 57. The effect of using the two separate CAMs 51 and 52 with match lines connected through respective AND gates 57 gives an operation generally similar to that of the use of a single CAM 11 described in FIG. 1. In other words it operates as a fully associative cache carrying out association or test operation on two parts of the full virtual address in parallel. However that part of the virtual address which represents the virtual page number provides a separate output from any match line 55 where a match has been found so as to access a corresponding word line 60 in the physical page RAM 53. Each of the possible match lines from the CAM 51 is connected through buffer circuitry 61 to a respective word line 60 of the RAM 53 and through a common OR gate 62 to indicate when a hit has been found in the virtual page CAM 51. It will be understood that each row of cells in the physical page RAM 53 contains the physical page number of a memory location corresponding to the virtual page numbers in the virtual page CAM 51. The data in the physical page RAM 53 is arranged on a row by row basis aligned with corresponding rows of the virtual page CAM 51. In this way, when a match is found on any one line 55 in the virtual page CAM 51 the corresponding word line 60 is activated in the RAM 53 so as to provide a physical page number as an output on line 33. This is equivalent to having a TLB hit in the circuitry described with reference to FIG. 2 thereby indicating that an address translation has been successful.

It will be seen that operation of the system shown in FIG. 3 has three possible results of a cache access operation. (1) A cache hit may be indicated by an output on line 22 indicating that a match has been obtained on the same line in the virtual page CAM 51 and the line in page CAM 52. In this case access for data on line 26 is provided for the corresponding word line 58 in the data RAM 50 and the result of the cache access is obtained with no time penalty for the address translation which is simultaneously carried out by the physical page RAM 53. (2) The access operation may result in a cache miss by failure to have match outputs on the same line in both the virtual page CAM 51 and the line in page CAM 52. If nevertheless a match is found in the virtual page CAM 51 this will provide an output through the buffer circuitry 61 and OR gate 62 indicating a TLB hit showing that the physical page number is in the physical page RAM and will be obtained through the output 33. In this case the physical address is obtained at the end of one cycle of operation and may be used for addressing the main memory to obtain the necessary data. (3) In a third situation the output on line 22 indicates a cache miss without any match in the virtual page CAM 51. This outputs a TLB miss through the OR gate 62. In this situation the virtual address will be dealt with by a backup translation mechanism (not shown) of known type which may be implemented as software. Although it will be slower than use of the cache hardware it will enable a correct main memory address to be accessed.

It will also be seen that the dual function of the one virtual page CAM 51 in determining both cache hits and TLB hits provides speed of operation in effecting both functions simultaneously and also avoids the need for additional circuitry which would arise if separate CAMs were used for the two functions.

FIG. 4 shows a modification of the arrangement shown in FIG. 3. In this case similar components have been marked with the same reference numerals as in FIG. 3. The data RAM 50, line in page CAM 52 and virtual page CAM 51 are the same as described with reference to FIG. 3. However the physical page RAM 53 is now replaced by a physical page CAM 65. Each row of cells in the physical page CAM has a word line 60 enabling read and write access to the row of cells as well as a match line 66 which is operable to indicate when a match is found between the content of that row of cells and the input to the CAM 65. The match lines 55 of the virtual page CAM 51 are connected along respective lines 56 through respective changeover switches 67 to respective AND gates 57. It will be understood that switch 67 forms one of a bank of switches each for a respective match line 55 and the switches 67 are all operated under common control to determine their common setting. When the system is used for virtual addressing each of the switches 67 is set to connect the respective output line 56 from the virtual page CAM 51 to its respective AND gate 57. The system then operates in exactly the same manner as has already been described in FIG. 3. A cache hit will cause data to be output or input in the RAM 50 at the location identified by the match lines 55 and 54 in the CAMs 51 and 52. At the same time a word line 60 in the physical page CAM will enable output at 33 of the physical address corresponding to the virtual address where the match occurred in the virtual page CAM 51. However, this example can also be used for physical addressing instead of virtual addressing. In this case line 33 is bidirectional and the physical page number is input at 33 to the physical page CAM 65 and the line in page address is input at 39 to the line in page CAM 52. All switches 67 are now set to interconnect possible match lines of the CAM 65 with respective AND gates 57 and disconnect lines 56. If the physical address is in the CAM 65 then a match will occur on an appropriate match line 66 and this will provide an output on line 68 through the switch 67 to the respective AND gate 57. Provided a match also occurred on the aligned match line 54 in the line in page CAM 52 this will be fed to the same AND gate 57 and thereby cause activation of the word line 58 of the corresponding line in the data RAM 50.

This facility for physical addressing in addition to virtual addressing with the arrangement of FIG. 4 is particularly applicable to achieving cache consistency. It can be used to avoid more than one virtual address in the cache referring to the same physical address in the main memory. A virtual addressing scheme may be used when one physical memory location is allocated to more than one virtual location. In the present examples the cache may not include more than one of the virtual locations at any one instant. If a cache access operation using a virtual address has resulted in a cache miss the physical address will either be obtained by a TLB hit from the physical page CAM 65 or alternatively by use of the backup translation mechanism. In either case the physical address is achieved and this can then be input into the physical page CAM 65 through the input 33. A match in the physical page CAM 65 will then indicate that the physical address is held in the cache provided a corresponding match was also found in the line in page CAM 52. The entry in the virtual page CAM 51 can then be modified to reflect the virtual address used to access the data. It will be understood that the virtual page CAM 51 and line in page CAM 52 each have word lines for each row of cells to allow writing of data into these CAMs. Buffer circuitry similar to that marked 15 in FIG. 1 is used to interconnect outputs of the gates 57 in FIG. 4 with corresponding word lines in the virtual page CAM 51 to permit rewriting of virtual page address after said physical addressing. The use of physical addressing is also useful in achieving bus snooping. When shared memory or direct memory accessing systems are used, it may be desirable to monitor physical addresses used on a memory addressing bus to determine whether or not data is to be changed at a particular physical address in the memory. Without this, the content of the physical location in the main memory may be changed without updating the corresponding contents of the cache. If the address on the bus is supplied to the physical CAM 65 it is possible to determine whether or not there is a cache entry corresponding to that physical address in the main memory. If so circuitry may be implemented to prevent the contents of the physical address in the main memory being changed without updating the contents of the cache corresponding to that physical address in memory.

The further embodiment of FIG. 5 is a modification of that shown in FIG. 4 and similar reference numerals have been used for similar parts. In this example the data RAM 50 and line in page CAM 52 are the same as previously described with reference to FIGS. 3 and 4. Similarly the column of AND gates 57 connected through a common OR gate 59 to indicate a cache hit are as previously described. However in this case the separate physical page CAM 65 and virtual page CAM 51 have been replaced by a single CAM 70 having common rows of CAM cells each row covering the dual function of a virtual page CAM in the right hand half and a physical page CAM in the left hand half as indicated respectively by numerals 51 and 65 in FIG. 5. Each row of CAM cells has a word line to permit read and write access to the row of cells as well as a match line to provide a suitable output when the contents of that row of cells corresponds with the input during an association mode of operation of the CAM. In FIG. 5 a typical match line is indicated at 71 and a typical corresponding word line at 72. The system may be used for either physical addressing or virtual addressing in a manner similar to that described for FIG. 4. However in this case the right hand half of the CAM 51 has a don't care input 73 in addition to the virtual page input 30. The left hand side of the CAM 65 has a don't care input 74 as well as physical page input and output 75 and 76. The two don't care inputs 73 and 74 to the respective halves of the CAM 70 are controlled by a virtual access input 77 connected directly to the input 74 and through an inverter 78 to input 73. When the system is to operate with virtual addressing a virtual access input is supplied at input 77 causing a don't care input to be applied at 74 but not at input 73. The function of the don't care inputs will be described in more detail with reference to FIGS. 10, 11 and 12. However the effect of applying a don't care input is to cause the CAM cells in a column to which the don't care input is applied to provide a match signal regardless of the content of that cell. This means that when a virtual access input is applied to 77, all columns of cells in the physical page CAM 65 receive don't care inputs from input 74 so that all cells in the left hand half of the CAM 70 provide a matching indication on their respective match lines. However, no don't care input is applied through 73 and so the virtual page number applied through input 30 is tested for association with the contents of the CAM cells in the right hand half of the CAM 70. On any match line where agreement is found between the contents of the cells and the input at 30 a match will occur on a selected match line 71 as matches will already have been indicated in the left hand side of the CAM 70 due to the don't care inputs at input 74. This will provide a matching output on one line 56 which is fed to its respective AND gate 57. Provided that the corresponding match line 54 in the line in page CAM 52 has provided a match for the line in page number input 39 then the data RAM 50 will be accessed at the word line 58 corresponding to the match lines in the line in page CAMs 52 and the composite CAM 70. When the system is to be used for physical addressing the virtual access input 77 is changed to indicate a physical access. This will cause removal of the don't care inputs at input 74 but the application of don't care inputs through 73 on each of the columns of CAM cells in the right hand half of the CAM 70 forming the virtual page CAM 51. This means that the right hand half of each of the match lines in the composite CAM 70 will provide matching signals and provided the physical address which is input at 75 is found in one of the rows of CAM cells in the left hand side of the CAM 70 then a match will be obtained on that match line 71. Provided a match is found on the aligned row in the line in page CAM 52 a second match output will be provided to the appropriate AND gate 57 causing access of the corresponding word line 58 of the data RAM 50. In the event that the line in page CAM does not provide a match signal but a match is found in the composite CAM 70 then the signal provided on the match line 71 in the composite CAM 70 will be fed through the buffer circuitry 61 enabling access to the word line 72 of the row of CAM cells in which the match occurs and a TLB hit will be provided through the common OR gate 62. During virtual addressing this will enable address translation to occur between virtual and physical page addresses with the physical address being read on output line 76.

It may be desirable in some cases for each of the line in page CAM 52, virtual page CAM 51 and physical page CAM 65 to include additional data beyond the line and page data already discussed. Such an arrangement is shown diagrammatically in FIG. 6 and may be applied to the contents of the CAMs in either FIGS. 4 or 5. In the example shown in FIG. 6 each of the CAMs includes an additional column of CAM cells to include a data valid flag. The additional column is marked 80 for the line in page CAM 52, 81 for the virtual page CAM 51 and 82 for the physical page CAM 65. This consists of an additional CAM cell at the left hand side of each row of CAM cells in the CAM which may be set to a value to indicate whether the data in that CAM location is valid. In the case of the line in page CAM 52 the remaining CAM cells contain data indicating the line in page number as marked at 83. In the virtual page CAM 51 the cells holding the virtual page number are indicated by an array of rows and columns marked 84. In addition one or more columns of cells may be provided for a process identifier marked 85 so that each row of cells indicating a virtual page number may be supplemented by one or more cells at the left hand end in columns 85 indicating the process using that virtual page number. The CAM 51 also includes a column of CAM cells 86 used for protection purposes as will be described below. In CAM 65 the array of cells holding the physical page number is marked 87 and a column of additional CAM cells 88 is used to indicate whether the page identified by each row is indeed a cacheable page. The valid cells in each of the columns 80, 81 and 82 can be set to a value such that a match on the line incorporating that cell is normally obtainable (provided a match is obtained on the remaining cells in the row) unless the valid status flag is set to an invalid value when that cell will always cause a mismatch on the row. In some cases it may be desirable that some areas of the physical main memory are not to be used in the cache and thereby form noncacheable areas. This may be useful in handling memory mapped I/O devices. If these areas of memory are to be accessed by a process using virtual addresses then it is still necessary to effect address translation for the virtual pages and access to these pages will take considerably longer unless it is possible to obtain TLB hit entries for these noncacheable pages. If a page is not to be cacheable then column 88 will have a cell indicating a noncacheable status in the row which contains the physical address of that memory location. When the first attempt is made to access a virtual address of a noncacheable page a TLB miss will occur due to the absence of the page in the cache. The relevant address translation will be obtained from a page table and a cache line can then be assigned to this memory location. However, in entering the location address in the cache the line in page CAM will be marked with an invalid status in column 80 for that memory location. Subsequent access operations to the cache using that address will always give a cache miss due to the invalid status associated with the line in page number for that entry. However the virtual page CAM 51 will still be capable of providing a TLB hit thereby accessing the physical page CAM 65 and providing the physical page number. In entering such a memory location in the cache the cacheable status in column 88 may also be changed to indicate that the memory location is a noncacheable location so that this information may be passed to the main memory system. In this way, when the cache is updated following a TLB miss and the memory location is entered into the cache, columns 88 and 80 may be adjusted to indicate whether or not the entry is a cacheable entry or not.

Figure 6:
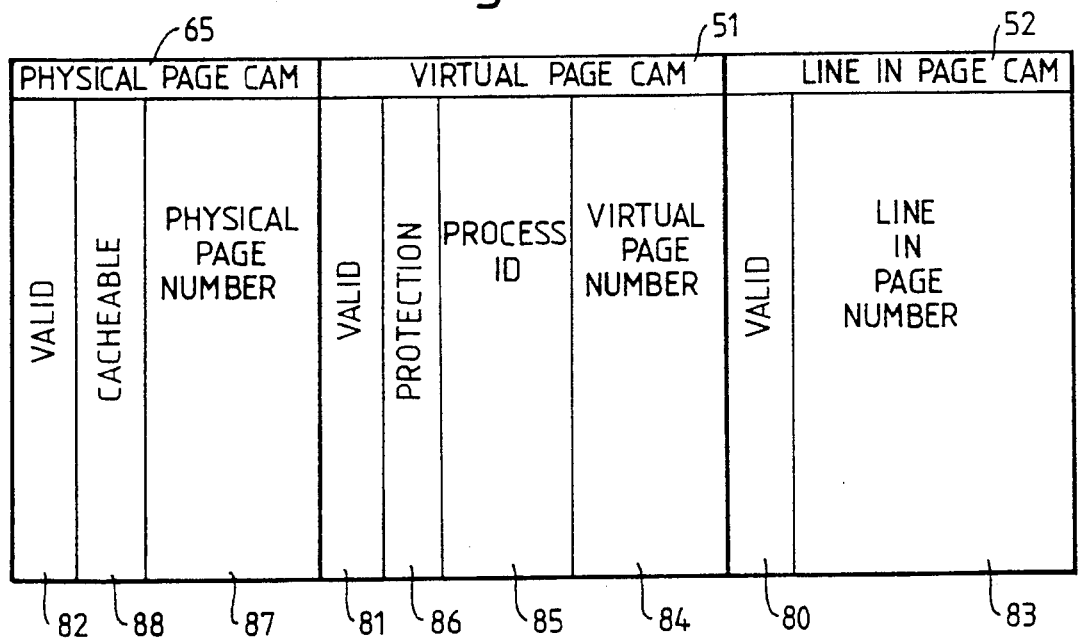
FIG. 6 shows more details of part of the embodiment shown in FIG. 4.

The protection column 86 indicated in FIG. 6 may be used to provide memory protection functions. For example, each page in a TLB may have an indication that the contents of the page are available for read, write or execute operations or restrictions may be placed on which of these operations may be effected on the contents of that page. It may be desired that certain pages cannot be written to. Each cell in the protection column 86 may be set to a value which normally prevents a match occurring on the line including that cell. It is however necessary in this case to provide for operation of don't care inputs so that when it is necessary to disregard the contents of the cells in column 86 matches can be obtained from appropriate lines regardless of the contents of that column 86. For example, to prevent writing to certain pages column 86 may have a value 1 into the write status bit of the appropriate lines in the virtual page CAM 51. For pages which may be written to this value will be set to zero in column 86. When in FIG. 5 the input 30 to the virtual page CAM indicates a write data requirement then the contents of the column 86 will be taken into account and rows which have a value 1 in column 86 will not be capable of giving a match so that writing will be prevented in those pages. If however the input at line 30 is not a write input so that a read is to occur then a don't care test condition is driven into the CAM cells in column 86 so that an association operation is carried out to find a matching line while disregarding the contents of the cells in column 86. In this way a write operation at a location which is write protected will cause a cache miss and a TLB miss. The memory accessing operation will be dealt with by backup translation mechanism. When a read operation is carried out all locations held in the virtual page CAM may be accessed with a possible cache hit and TLB hit.

The use of test conditions to drive CAM cells in a selected column to a don't care state may be used for purposes other than memory protection. A variety of functions which require searching only part of the CAM contents can make use of don't care states. For example all cache entries referring to a particular process can be identified by searching the virtual page CAM 51 for the process identifiers in column 85 by arranging that all CAM cells in columns 81, 86 and 84 are driven to a don't care state such that matches will be found wherever the process identifiers in column 85 agree with the process identifier input to the virtual page CAM. This way of identifying all entries relating to a particular process can be of assistance in deleting a process from the cache by finding the relevant entries and clearing their valid bits in column 81 of the virtual page CAM 51.

The CAMs used in FIGS. 4 and 5 may all include CAM cells with test circuitry to drive cells to don't care states so that selection of some only of the cells for use in the association operation allows different functions to be achieved. The embodiments of FIGS. 4 and 5 may be implemented with a single CAM, part of each row representing physical pages, part representing virtual pages and part representing line in page numbers. To look for a cache hit, the cells representing physical pages in each row must be driven to a don't care state allowing the search to be done on the other two parts of the row. To look for a TLB hit rather than a cache hit, the cells representing physical pages and the cells representing the line in page numbers must be driven to a don't care state thereby selecting only the virtual page cells for the association operation.

The construction of the CAM cells and the control logic necessary for read write and associate operations of the CAM cells will now be described with reference to FIGS. 7, 8 and 9.

Figure 7:
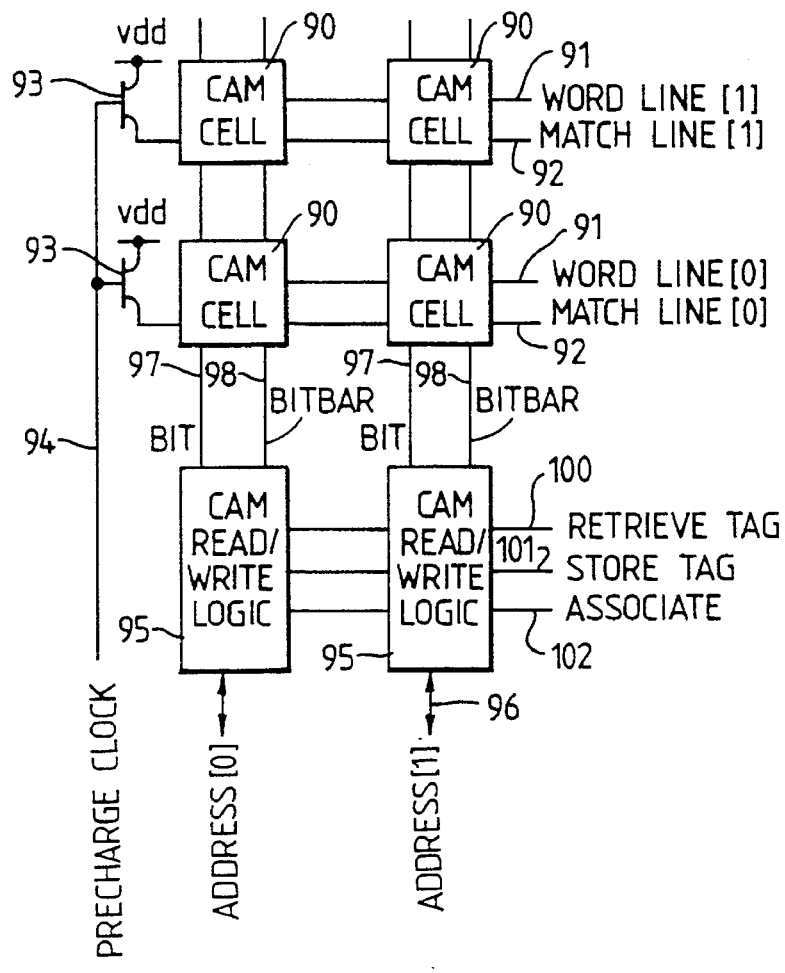
FIG. 7 shows part of an array of CAM cells and CAM control logic for use with the embodiments of any of FIGS. 3, 4 or 5.

The arrangements shown in FIG. 7 is part of an array of CAM cells 90 arranged in rows and columns which may be used in the embodiments already described with reference to FIGS. 3 and 4. CAM arrays of this type have the facility for storing part of a memory address into the CAM which is referred to as "store tag" as well as reading the contents of each cell which is referred to as "retrieve tag" or an associate operation where the contents of the CAM cells are tested to see if they contain part of an address or tag corresponding to address data which is input to the CAM. As shown in FIG. 7 each row of CAM cells 90 is connected by a common word line 91 and match line 92. Each match line 92 is connected through a control transistor 93 to a precharge line 94 for precharging the match lines when an associate operation is carried out. Each column of CAM cells 90 is connected to read/write logic 95 having a bidirectional input and output 96 for the input or output of an address tag. Each logic circuit 95 is connected by two lines 97 and 98 representing Bit and Bitbar respectively, to each of the CAM cells 90 in that column. Each of the read/write logic circuits 95 is connected to a common retrieve tag control line 100 as well as a common store tag control line 101 and a common associate line 102. The operation of this arrangement will be described in more detail with reference to FIGS. 8 and 9. FIG. 8 shows the construction of each CAM cell 90. The cell consists of a latch 103 formed by two inverters 104 and 105 connected in parallel and in opposite directions between nodes 106 and 107. Node 106 is connected to the Bitbar line 98 through a pass transistor 108 having its gate coupled to the word line 91. Similarly node 107 is connected to the Bit line 97 through a pass transistor 109 having its gate coupled to the word line 91. The latch 103 operates in the manner of a conventional RAM cell in that when the word line 91 is charged the pass transistors 108 and 109 cause the latch 103 to adopt one of two stable states depending on the signals on lines 97 and 98 so that either node 106 is high with node 107 low or node 107 is high with node 106 low. To allow this cell to carry out the associate operation the match line 92 is precharged and each cell 90 may selectively discharge the match line to earth 110. Each cell provides two sets of series transistors to interconnect the match line 92 with earth 110. As shown in FIG. 8 two transistors 111 and 112 form one such connection to earth and two further transistors 113 and 114 provide a second series connection between the match line 92 and earth 110. Transistor 111 has its gate connected to node 106 so that it is turned on when node 106 is high. Transistor 112 has its gate connected to the Bitbar line 98 so that this transistor is turned on when the signal is high on line 98. Similarly transistor 113 has its gate connected to node 107 and is therefore turned on when node 107 is high. Transistor 114 has its gate connected to the Bit line 97 and is turned on when the signal is high on line 97. The match line 92 can in this way be discharged if the signals on lines 97 and 98 during an associate operation have values corresponding to those already stored in the cell 90. The control circuitry 95 for operating the cell 90 is shown in FIG. 9. Similar signal lines in FIG. 9 to those used in FIG. 7 have similar reference numerals. The control circuitry includes an OR gate 115 having inputs 101 and 102. An exclusive OR gate 116 has inputs from line 102 and the input 96. A sense amplifier 117 controlled by signal line 100 receives inputs from the bit line 97 and Bitbar line 98. The output of the gate 116 is provided through a pass transistor 118 to the Bit line 97. The output of the gate 116 is also provided through an inverter 119 and a pass transistor 120 to the Bitbar line 98. The transistors 118 and 120 are controlled by connecting their gates to the output of the OR gate 115. During a store tag operation the associate input 102 has a value 0 as does the retrieve tag input 100. The store tag input has a value 1 and thereby causes the OR gate 115 to switch on the two transistors 118 and 120. The tag to be stored is input at 96 and forms one input to the exclusive OR gate 116 which acts as a selectable inverter. While the associate input 102 has a value 0 gate 116 transmits the input from 96 with no inversion. When the associate input 102 has a value 1 gate 116 outputs with inversion the signal which is input at 96. Consequently during a store tag operation Bitline 97 has the signal which is input at 96 and due to the inverter 119 the Bitbar line 98 carries the inverse of the input at 96. With charging of the appropriate word line 91 the values on lines 97 and 98 are thereby stored in the appropriate cell 90 causing the nodes 106 and 107 to take up values corresponding to those on the respective Bit and Bitbar lines 97 and 98. During a retrieve tag operation, both inputs to the OR gate 115 are 0 causing the transistors 118 and 120 to be turned off. Charging of the required word line 91 causes stored values at nodes 107 and 106 to be transmitted through the Bit and Bitbar lines 97 and 98 to the amplifier 117 which thereby provides an output through 96 representing the value which was stored in the cell. During an associate operation the OR gate 115 is turned on as input 102 has the value 1 and input 101 has the value 0. This causes the two transistors 118 and 120 to be turned on. The input 102 to the exclusive OR gate 116 now has the value 1 which causes inversion by the gate 116 of any input at 96. This then causes the Bit line 97 to have a signal which is the inverse of that input at 96 and Bitbar line 98 has a signal which is the same as the input at 96. This is applied to the cells for which the match lines 92 are precharged. If the cell stores a value 1 represented by node 107 being high and 106 being low, an input of 1 during an associate operation will cause Bitbar 98 to be high and Bit 97 to be low. Although the high value on node 107 will switch on transistor 113 the low value on Bit line 97 will cause transistor 114 to be switched off preventing discharge of the match line 92 through transistor 114. Similarly the low value stored on node 106 will switch off transistor 111 thereby preventing discharge of the match line 92 through the transistors 111 and 112 although transistor 112 will be switched on by the high value on Bitbar line 98. Consequently the match line 92 will not be discharged. If on the other hand the input at 96 represents a value 0 during an associate operation then the values on lines 97 and 98 will be reversed so that the value on line 97 will be high and the value on line 98 will be low. In this situation the match line 92 will be discharged as transistor 113 will be switched on by the stored high value at node 107 and by the high value on line 97 causing transistor 114 to be switched on thereby providing a discharge route between the match line 92 and earth 110. It will therefore be seen that during an associate operation cells 90 cause discharge of the match line 92 only where the input at input 96 does not correspond with the stored information in the cell. Where correspondence is found the match line remains charged.

Figure 8:
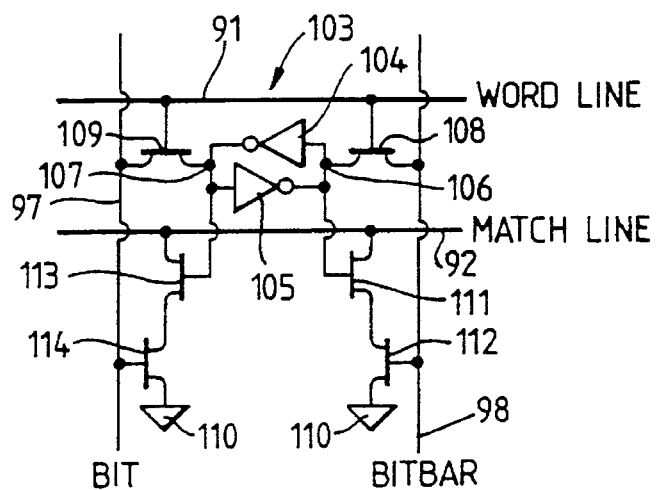
FIG. 8 shows more detail of a CAM cell for use in FIG. 7.
Figure 9:
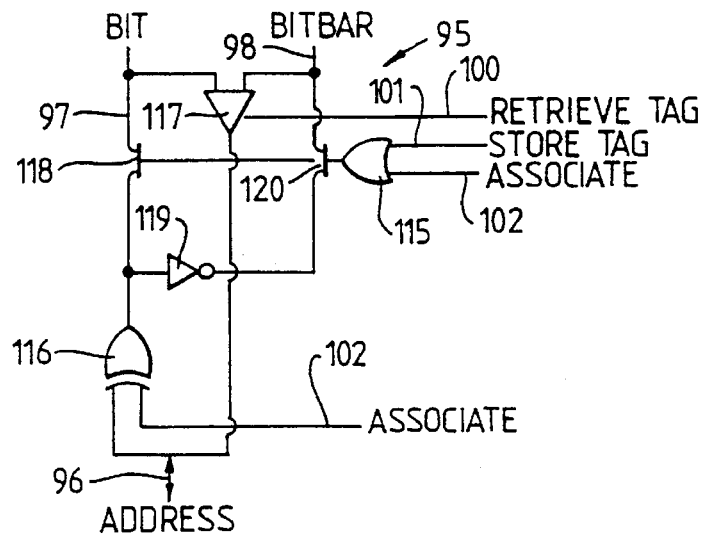
FIG. 9 shows more detail of the control logic used in the CAM array of FIG. 7.
Figure 10:
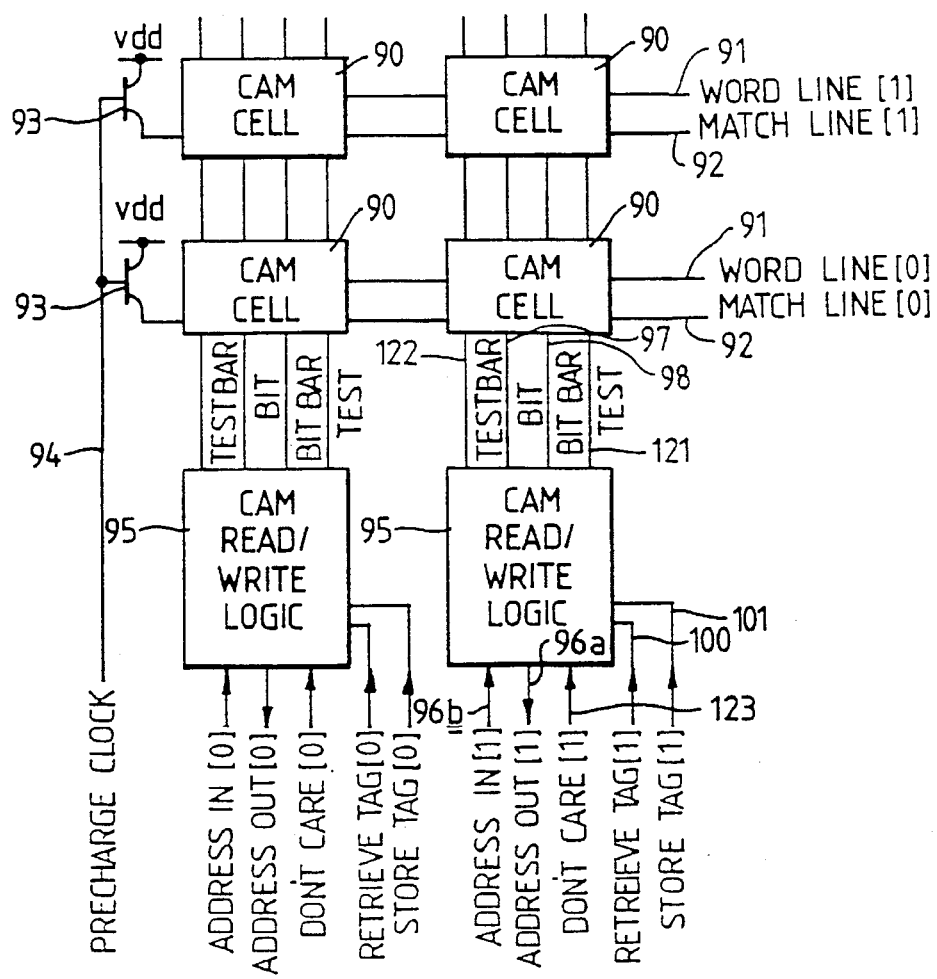
FIG. 10 shows an alternative to the array of FIG. 7 which may be used with the embodiments of any of FIGS. 3, 4 or 5 including the use of don't care inputs.
Figure 11:
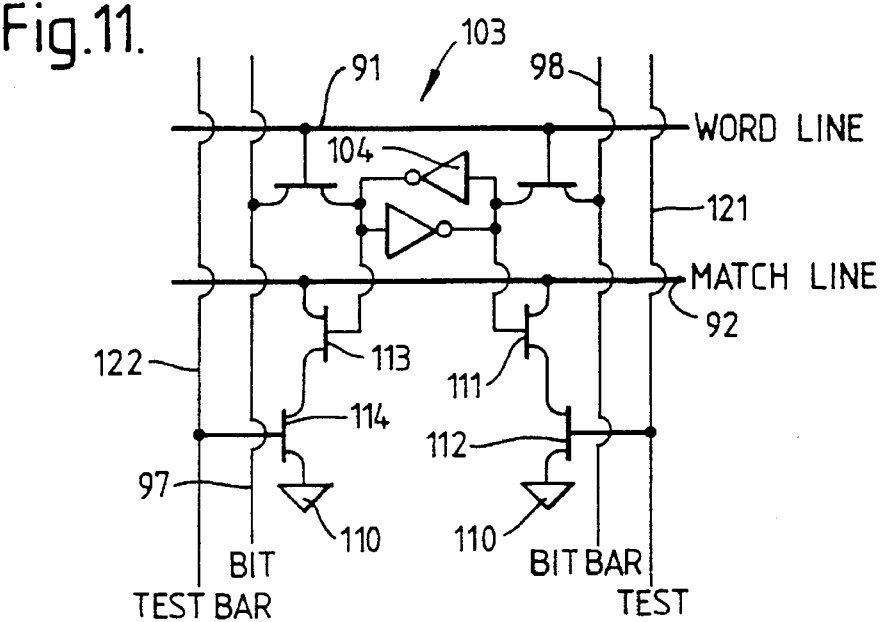
FIG. 11 shows more detail of a single CAM cell for use in FIG. 10.
Figure 12:
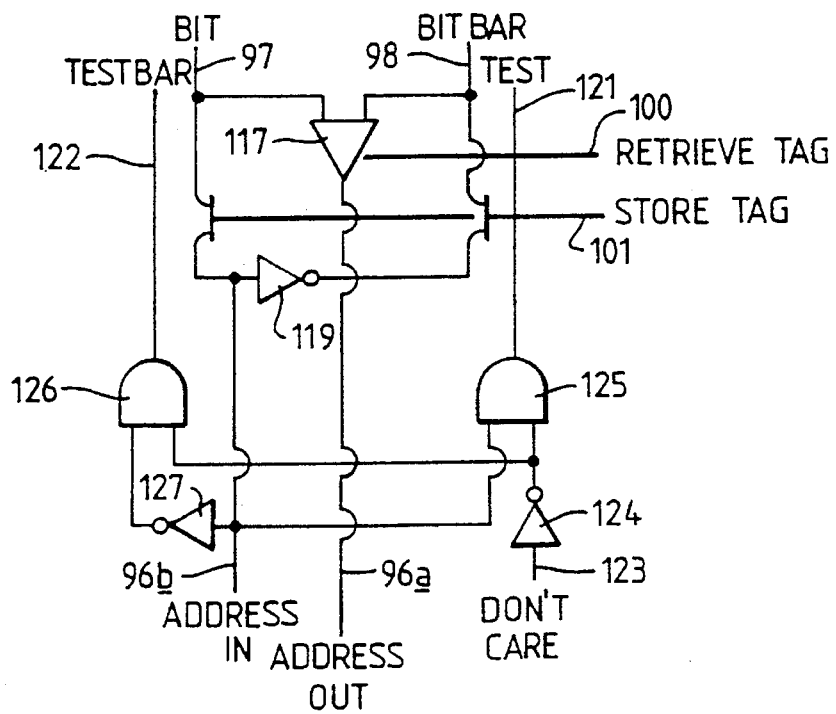
FIG. 12 shows more detail of the control logic used for the CAM cells of FIG. 10.

The arrangement shown in FIGS. 10, 11 and 12 is generally similar to that described in FIGS. 7, 8 and 9 although it has the addition of inputting a don't care state to each of the CAM cells 90. In this example each of the read/write control logic circuits 95 is connected to the column of CAM cells 90 by two additional lines 121 and 122 called Test and Testbar respectively in addition to the Bit and Bitbar lines 97 and 98. Each of the read/write logic circuits 95 also has a don't care input 123. As is shown in FIG. 11, each cell 90 has a latch circuit 103 having the same components as that already described with reference to FIG. 8 and the operation of storing tags or reading tags from the cells is the same as previously described where the appropriate signals are fed in or out of the Bit and Bitbar lines 97 and 98 when the appropriate word line 91 is energised. However the associate operation is in this case carried out by use of the Test and Testbar lines 121 and 122 which are connected to the gates of transistors 112 and 114. The control of signals on the Bit and Bitbar lines 97 and 98 and test and test bar lines 121 and 122 are controlled by the circuitry shown in FIG. 12. The store tag and retrieve tag operations are controlled by signals on the Bit and Bitbar lines 97 and 98 as previously described with reference to FIG. 9 although in this case the transistors 118 and 120 are controlled directly by the store tag input 101 without the need for the OR gate 115 referred to in FIG. 9. The output of data on line 96a by the amplifier 117 is as previously described. The input of data on line 96b is fed through the inverter 119 to the Bit and Bitbar lines 97 and 98 as previously described. When it is required that a column of CAM cells 90 is rendered inoperative during an associate operation on other columns of CAM cells it is necessary to feed in a don't care input 123 so that cells in that column do not cause discharge of the match lines regardless of the input on line 96b relative to the contents of the cells in that column. As shown in FIG. 12 the don't care input 123 is fed through an inverter 124 which provides an output to each of two AND gates 125 and 126. The second AND gate 125 has a second input from the store tag input 96b. The AND gate 126 has as its second input the store tag input 96b after passing through an inverter 127. When it is required to drive a column of cells into a don't care state, an input 1 is input at 123 which due to the inverter 124 provides zero inputs to both the AND gates 125 and 126. This ensures that zero values occur on both the Test and Testbar lines 121 and 122. As these lines 121 and 122 control the operation of both transistors 112 and 114 both those transistors are turned off thereby preventing discharge of the match line 92. This ensures that cells in that column do not cause any discharge of the match line regardless of the contents of the cells in that column. When the column of cells is operated with a zero input on the don't care input 123, this causes the inverter 124 to provide a value 1 to both the AND gates 125 and 126. The values which are then output on the Test lines 121 and 122 depend on the input value of store data on line 96b. If the input 96b is zero then the test line 121 has the value zero and the Testbar 122 has the value 1. The signal values on lines 121 and 122 are reversed if the input on line 96b is reversed. In this way the match lines 92 when precharged before an associate operation may be discharged to earth 110 to either the pair of transistors 111, 112 or 113 and 114 if the value stored in the CAM cell does not match that which is input at 96b and supplied on lines 121 and 122. The operation of the transistors 111, 112, 113 and 114 to discharge the match lines 92 is now the same in response to the signals on lines 121 and 122 as was previously described with respect to the signals on lines 97 and 98.

The invention is not limited to the details of the foregoing examples.

We claim:

1. A fully associative cache memory for virtual addressing comprising a data RAM, a first CAM cell array for holding virtual page addresses wherein each of said virtual page addresses requires address translation to identify a physical page in a main memory, a second CAM cell array holding line or word in page addresses, address input circuitry connected to both said first and second CAM cell arrays, a physical address memory for holding physical page addresses for the main memory corresponding to virtual page addresses in said first CAM cell array, and data RAM access control circuitry, said first CAM cell array having hit output circuitry connected to said physical address memory to access said physical address memory and effect address translation only in response to a combination of a hit output from said first CAM cell array and a miss output from said second CAM cell array, and said data RAM access control circuitry being coupled to hit output circuitry of both said first and second CAM cell arrays and to the data RAM to access the data RAM only in response to hit outputs from both said first and second CAM cell arrays.

2. A fully associative cache memory according to claim 1 in which said physical address memory comprises a CAM cell array coupled to said data RAM access control circuitry to permit physical addressing of said cache as well as virtual addressing of the cache.

3. A cache memory device for virtual addressing which device comprises a data RAM for holding data corresponding to selected locations in a main memory, first and second content addressable memory (CAM) cell arrays for holding respectively most and least significant bits of addresses using virtual pages and corresponding to said selected locations for which data is held in said data RAM, input circuitry connected to both the first and second CAM cell arrays for inputting a first set of bits of an address as a first input to said first array and inputting a second set of bits of said address as a second input to said second array in each cache access operation, hit output circuitry for providing first and second outputs from said first and second arrays respectively to indicate a cache hit when each of said first and second arrays holds bits of an address corresponding respectively to the bits of said first and second inputs, first control circuitry interconnecting said first and second outputs and connected to said data RAM to access a selected location of said data RAM when both said first and second outputs indicate a cache hit, and a physical address memory holding a plurality of physical addresses of locations in said main memory corresponding to virtual addresses in said first array, said physical memory being connected by second control circuitry to said hit output circuitry of said first array, said second control circuitry being operable to access a selected location of the physical address memory only when said first output of said hit output circuitry includes a hit signal indicating that the first array holds bits of an address corresponding to said first input and said second output of said bit output circuitry includes a miss signal indicating that the second array does not hold bits of an address corresponding to said second input.

4. A cache memory device according to claim 3 in which each of said virtual address comprises a page address and a line-in-page address, said first array holding a plurality of virtual page addresses and said second array holding a plurality of line-in-page addresses.

5. A cache memory device according to claim 3 or claim 4 in which said physical address memory comprises a plurality of addressable storage locations each of which is capable of being written to or read from, and said second storage control circuitry is arranged to address a selected storage location in the physical address memory in response to a first output including a hit signal from said first array to read a physical address from the physical address memory corresponding to the virtual address in the first array which generated the signal in said first output.

6. A cache memory device according to claim 3 in which said first control circuitry includes gating circuitry to indicate a cache hit when both said first and second outputs include hit signals indicating location in the first and second arrays of addresses corresponding to the respective first and second inputs.

7. A cache memory device according to claim 6 in which said second control circuitry includes gating circuitry to indicate an address translation hit when said first output includes a hit signal indicating a location in the first array of an address corresponding to the first input.

8. A cache memory device according to claim 3 in which said physical address memory comprises a CAM operable both as a RAM when accessed by said first array and operable as a CAM in response to a physical address input.

9. A cache memory device according to claim 8 in which said physical address memory comprises a CAM having an input for receiving a physical address and an output connected to said first control circuitry whereby said data RAM is accessed both by virtual addressing of said first and second arrays and by physical addressing of said physical address memory and addressing said second array.

10. A cache memory device according to claim 3 in which each of said first and second arrays, data RAM and physical address memory comprise storage locations arranged in rows, each row in the data RAM being associated with a corresponding row in each of the first and second arrays and physical address memory.

11. A cache memory device according to claim 10 in which each row of storage locations in one of arrays of CAM cells includes in addition to storage locations for bits of a virtual address, at least one location for a status bit for use in restricting operations that are effected on the corresponding main memory location.

12. A cache memory device according to claim 11 in which each row in said first and second arrays includes a bit location operable to prevent writing to a memory address indicated by the virtual address held in that row.

13. A cache memory device according to claim 10 in which each row of storage locations in the first and second CAM arrays includes a bit location for holding a flag indicating validity of the cache entry corresponding to that row.

14. A cache memory device according to claim 3 in which at least one of said first and second arrays includes circuitry having a don't care input operable to cause CAM cells connected to that don't care input to provide a match with the respective first or second input regardless of data stored in the cell.

15. A cache memory device according to claim 14 in which each CAM cell has a match line for each row of cells, circuitry for precharging each match line, and control circuitry for each column of cells, the control circuitry having control inputs to initiate an associate operation for the cells of that column, each cell having discharge circuitry coupled to said control circuitry for discharging the match line by any cell in the column which has data stored corresponding to data input to that column during an associate operation.

16. A cache memory device according to claim 14 in which each column of cells in said first array of CAM cells is connected to control circuitry having said don't care input.

* * * * *